United States Patent
Ueda

(10) Patent No.: US 11,098,851 B2
(45) Date of Patent: Aug. 24, 2021

(54) HIGH-PRESSURE TANK AND ATTACHMENT STRUCTURE THEREOF

(71) Applicant: TOYOTA JIDOSHA KABUSHIKI KAISHA, Toyota (JP)

(72) Inventor: Naoki Ueda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 16/661,218

(22) Filed: Oct. 23, 2019

(65) Prior Publication Data

US 2020/0158287 A1 May 21, 2020

(30) Foreign Application Priority Data

Nov. 15, 2018 (JP) .............................. JP2018-214946

(51) Int. Cl.
*F17C 1/06* (2006.01)

(52) U.S. Cl.
CPC ........ *F17C 1/06* (2013.01); *F17C 2201/0109* (2013.01); *F17C 2203/0604* (2013.01); *F17C 2203/0621* (2013.01); *F17C 2203/0665* (2013.01); *F17C 2203/0668* (2013.01)

(58) Field of Classification Search
CPC ................. F17C 1/06; F17C 1/04; F17C 1/02
USPC ...................... 220/590, 589, 588, 586, 62.19
See application file for complete search history.

(56) References Cited

U.S. PATENT DOCUMENTS

| 3,335,903 | A | * | 2/1964 | Anderson | ............... | B65D 88/76 |
| | | | | | | 220/62.19 |
| 3,661,294 | A | * | 5/1972 | Pearson | ............... | B65D 90/029 |
| | | | | | | 220/645 |
| 3,785,040 | A | * | 1/1974 | Pechacek | ................... | F17C 1/04 |
| | | | | | | 29/447 |
| 4,004,706 | A | * | 1/1977 | Guldenfels | ............ | B65D 90/02 |
| | | | | | | 220/586 |
| 4,699,288 | A | * | 10/1987 | Mohan | .................... | B29C 53/60 |
| | | | | | | 220/590 |
| 5,547,533 | A | * | 8/1996 | Berglund | ............ | B29C 65/5042 |
| | | | | | | 156/175 |

(Continued)

FOREIGN PATENT DOCUMENTS

| JP | 2012-066674 | 4/2012 |
| JP | 2017-072244 | 4/2017 |

OTHER PUBLICATIONS

U.S. Appl. No. 16/564,374, filed Sep. 9, 2019.

*Primary Examiner* — Robert J Hicks

(74) *Attorney, Agent, or Firm* — Finnegan, Henderson, Farabow, Garrett & Dunner, LLP

(57) ABSTRACT

A high-pressure tank includes: a liner made of resin and including a tubular body portion and a pair of dome-shaped side end portions provided in the opposite ends of the body portion; and a fiber reinforced resin layer made of a fiber reinforced resin and covering an outer peripheral surface of the liner. The fiber reinforced resin layer is formed by winding a fiber bundle impregnated with a resin, and an outer peripheral surface of the fiber reinforced resin layer is covered with a resin layer made of a resin. A part of the fiber reinforced resin layer includes a protrusion portion by continuously winding the fiber bundle in an overlapped manner along the circumferential direction of the body portion the part of the fiber reinforced resin layer covering the body portion.

3 Claims, 6 Drawing Sheets

(56) References Cited

U.S. PATENT DOCUMENTS

| | | | | |
|---|---|---|---|---|
| 8,038,029 | B2* | 10/2011 | Lindner | F17C 1/16 |
| | | | | 220/588 |
| 2018/0080607 | A1* | 3/2018 | Van Haaren | F16J 12/00 |
| 2020/0116304 | A1* | 4/2020 | Lee | F17C 1/06 |
| 2020/0276775 | A1* | 9/2020 | Ueda | F17C 1/06 |
| 2020/0292130 | A1* | 9/2020 | Van Haaren et al. | F17C 1/16 |

* cited by examiner

COMPARATIVE EXAMPLE

HIGH-PRESSURE TANK AND ATTACHMENT STRUCTURE THEREOF

INCORPORATION BY REFERENCE

The disclosure of Japanese Patent Application No. 2018-214946 filed on Nov. 15, 2018 including the specification, drawings and abstract is incorporated herein by reference in its entirety.

BACKGROUND

1. Technical Field

The disclosure relates to a high-pressure tank into which gas is filled and an attachment structure thereof.

2. Description of Related Art

In the related art, a high-pressure tank includes a resin liner in which gas is stored and a fiber reinforced resin layer made of a fiber reinforced resin and covering an outer peripheral surface of the liner. The liner includes a tubular body portion and a pair of dome-shaped side end portions formed in the opposite ends of the body portion. The fiber reinforced resin layer is formed in such a manner that a fiber bundle impregnated with a matrix resin is continuously wound around the body portion and the side end portions. An outer surface of the fiber reinforced resin layer is covered with a resin layer made of the same resin as the fiber reinforced resin.

As such a technology, Japanese Unexamined Patent Application Publication No. 2017-072244 (JP 2017-072244 A) proposes a high-pressure tank including, as a fiber reinforced resin layer, a reinforcing layer covering an outer peripheral surface of a liner and a protective layer covering an outer peripheral surface of the reinforcing layer. Here, a breaking strain of a first resin constituting a fiber reinforced resin of the reinforcing layer is set to be larger than a reference strain that is a tensile strain to be generated in the axial-center direction of a cylindrical portion of the high-pressure tank in a predetermined pressure test for the high-pressure tank. Further, a breaking strain of a second resin constituting a fiber reinforced resin of the protective layer is set to be smaller than the reference strain.

In the high-pressure tank configured as such, very small cracks can be formed in the protective layer and a resin layer formed on a surface of the protective layer at the time of the pressure test. Hereby, at the time when the high-pressure tank is used, gas filled in the high-pressure tank passes through the liner, and the gas thus passing through the liner is discharged outside the high-pressure tank through the very small cracks.

SUMMARY

However, the very small cracks are easily formed in a boundary surface between reinforcing fibers and a resin constituting the fiber reinforced resin layer, but the very small cracks can hardly reach the resin layer on an outer surface of the fiber reinforced resin layer. Hereby, even when the gas filled in the high-pressure tank passes through a part of the liner and the fiber reinforced resin layer at the time when the high-pressure tank is used, the gas cannot pass through the resin layer as an outermost layer, so that the gas might stay between the fiber reinforced resin layer and the resin layer. When a pressure of the gas thus staying exceeds a predetermined pressure, cracks might be formed in the resin layer and abnormal noise might be caused in the high-pressure tank.

The disclosure provides a high-pressure tank configured such that gas filled in the high-pressure tank passes through a liner and the gas thus passing through the liner can be sufficiently discharged outside from a fiber reinforced resin layer.

A high-pressure tank according to a first aspect of the disclosure includes a liner, a fiber reinforced resin layer, and a resin layer. The liner is made of resin and includes a tubular body portion and a pair of dome-shaped side end portions formed in opposite ends of the body portion. The fiber reinforced resin layer is made of a fiber reinforced resin and covers an outer peripheral surface of the liner. The fiber reinforced resin layer is formed by winding a fiber bundle impregnated with a matrix resin. The resin layer is made of the same resin as the matrix resin and is provided over an outer surface of the fiber reinforced resin layer. A part of the fiber reinforced resin layer includes a protrusion portion formed continuously winding the fiber bundle in an overlapped manner along a circumferential direction of the body portion, the part of the fiber reinforced resin layer covering the body portion.

With the disclosure, at the time when the high-pressure tank is subjected to a pressure test, a stress concentrates on the protrusion portion formed in the fiber reinforced resin layer, so that cracks are easily formed in the resin layer covering the protrusion portion. Hereby, gas passing through the liner can be released outside the high-pressure tank through the cracks thus formed in the resin layer covering the protrusion portion.

Further, in the pressure test, even in a case where the cracks are not formed in the resin layer, when gas filled at the time of use of the high-pressure tank reaches the protrusion portion, cracks are formed in the resin layer covering the protrusion portion at a pressure lower than that in other parts. This is because the protrusion portion has a vulnerable shape on which a stress easily concentrates in comparison with other parts. Accordingly, differently from the related art, cracks are not formed in the resin layer after high-pressure gas stays, so that it is possible to restrain the occurrence of large abnormal noise in the high-pressure tank and to discharge gas.

The present specification also discloses an attachment structure for the high-pressure tank. An attachment structure for a high-pressure tank, according to a second aspect of the disclosure, includes: the high-pressure tank; and a band configured to attach the high-pressure tank. The band is placed at a position adjacent to the protrusion portion.

With the disclosure, the band configured to attach the high-pressure tank is placed at the position adjacent to the protrusion portion of the high-pressure tank, and therefore, the protrusion portion of the high-pressure tank is locked by the band, thereby making it possible to restrict a movement of the high-pressure tank in the axial-center direction. Hereby, a movement of the high-pressure tank from a position where the high-pressure tank is provided, due to slip of the band, is restricted.

With the disclosure, gas filled in a high-pressure tank can pass through a liner, and the gas thus passing through the liner can be sufficiently discharged outside from a fiber reinforced resin layer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
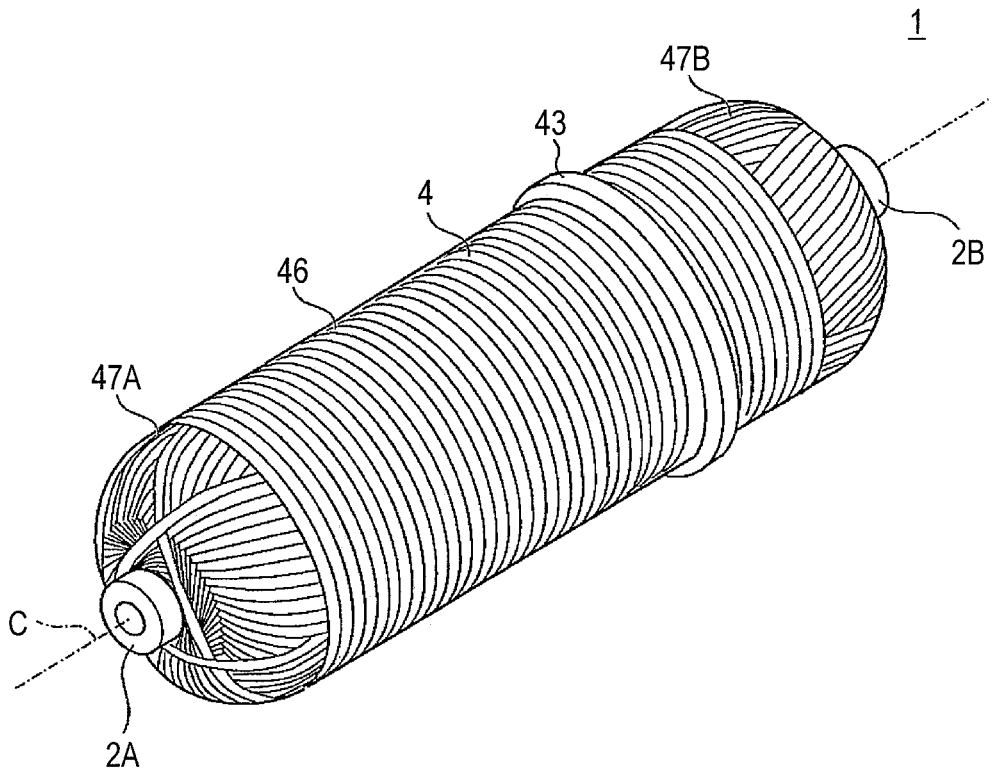
FIG. 1 is a schematic perspective view of a high-pressure tank according to one embodiment of the disclosure.
Figure 2:
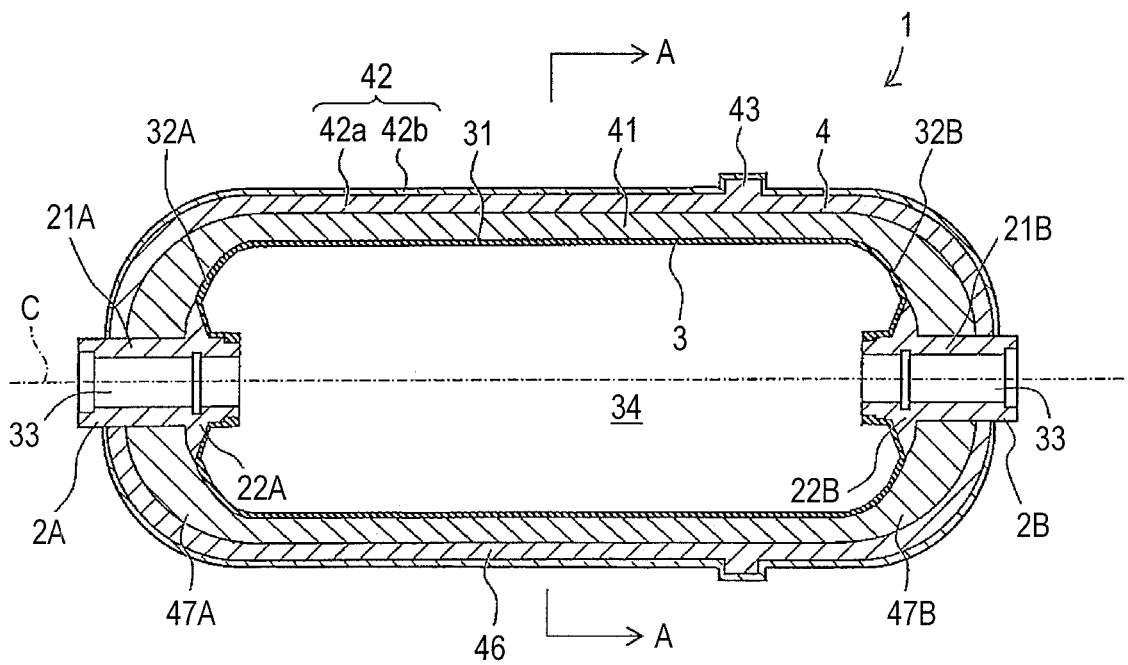
FIG. 2 is a sectional view of the high-pressure tank along the axial center of a liner in FIG. 1.
Figure 3:
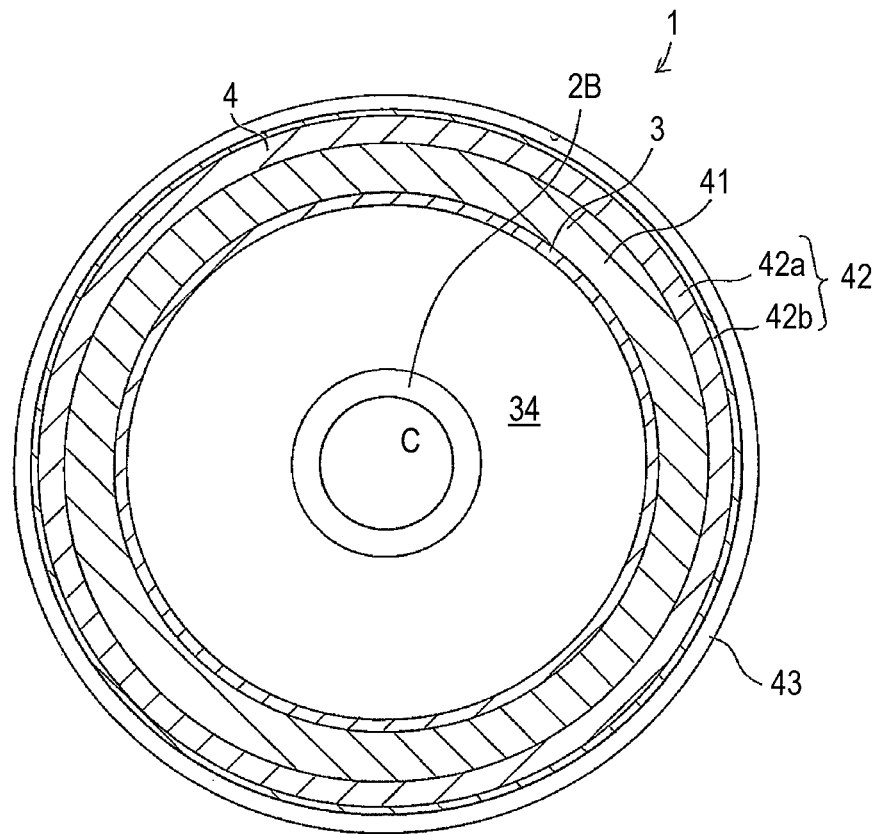
FIG. 3 is a sectional view taken along an arrow A-A in FIG. 2.

With reference to FIGS. 1 to 4, the following describes a high-pressure tank 1 of the present embodiment. FIG. 1 is a schematic sectional view of the high-pressure tank 1 according to one embodiment of the disclosure. FIG. 2 is a sectional view of the high-pressure tank along the axial center of a liner in FIG. 1. FIG. 3 is a sectional view taken along an arrow A-A in FIG. 2.

As illustrated in FIG. 1, the high-pressure tank 1 is a fuel tank in which hydrogen gas is stored as a fuel gas for a fuel cell in a fuel cell system to be provided in a vehicle. Note that the high-pressure tank 1 may be used for any purposes other than the fuel cell system, and for example, various compressed gases such as compressed natural gas (CNG), various liquefied gases such as liquefied natural gas (LNG) and liquefied petroleum gas (LPG), and other various pressurization substances may be filled in the high-pressure tank 1 as the fuel gas other than hydrogen gas.

As illustrated in FIGS. 2 and 3, the high-pressure tank 1 includes a resin liner 3 into which hydrogen gas is filled, first and second mouth pieces 2A, 2B made of metal and attached to the opposite ends of the liner 3, and a fiber reinforced resin layer 4 around which a fiber reinforced resin is wound to cover an outer peripheral surface of the liner 3 and outer peripheral surfaces of parts of the mouth pieces 2A, 2B.

The liner 3 is made of a resin having a gas barrier property with respect to hydrogen gas. A resin material of the liner 3 can be, for example, a thermoplastic resin such as polyethylene, polypropylene, nylon polyamide, or an ethylene vinyl alcohol copolymer.

The liner 3 includes a tubular body portion 31 and a pair of dome-shaped first and second side end portions 32A, 32B formed to be continuous with the opposite ends of the body portion 31. A storage space 34 in which hydrogen gas is to be stored (filled) is formed inside the liner 3.

More specifically, the body portion 31 is a cylindrical portion having a predetermined length and extending along an axial center C of the liner 3 of the high-pressure tank 1 as illustrated in FIG. 2. Note that the axial center C of the liner 3 corresponds to the axial center of the high-pressure tank 1. The side end portions 32A, 32B are continuous with the opposite sides of the body portion 31 and have a shape projecting into a hemispherical shape. Respective top portions of the side end portions 32A, 32B are opened, and the metal mouth pieces 2A, 2B are attached to respective openings of the side end portions.

The first mouth piece 2A is made of metal such as aluminum or aluminum alloy and includes a tubular portion 21A as a main body and a flange portion 22A formed on the outer periphery of the tubular portion 21A. In a state where the flange portion 22A of the first mouth piece 2A is pressed against an outer surface of the first side end portion 32A, the fiber reinforced resin of the fiber reinforced resin layer 4 is wound around the flange portion 22A as well as the liner 3. A valve (not shown) is attached to the first mouth piece 2A, so that hydrogen gas is discharged from the high-pressure tank 1 or flows into the high-pressure tank 1 by the valve.

Similarly to the first mouth piece 2A, the second mouth piece 2B is made of metal such as aluminum or aluminum alloy and includes a tubular portion 21B as a main body and a flange portion 22B formed on the outer periphery of the tubular portion 21B. In a state where the flange portion 22B of the second mouth piece 2B is pressed against an outer surface of the second side end portion 32B, the fiber reinforced resin of the fiber reinforced resin layer 4 is wound around the flange portion 22B as well as the liner 3. The inside of the tubular portion 21B of the second mouth piece 2B is further closed from the state illustrated in FIG. 2, so that the storage space 34 is sealed by the second mouth piece 2B.

The fiber reinforced resin layer 4 is constituted by the fiber reinforced resin (FRP) formed such that a fiber bundle (filament) of reinforcing fibers arranged in one direction is impregnated with a matrix resin. In the present embodiment, the fiber bundle impregnated with the matrix resin is continuously wound in hoop winding or helical winding so that a plurality of layers is formed on the outer peripheral surface of the liner 3 and respective exposed outer peripheral surfaces of the mouth pieces 2A, 2B.

In the present embodiment, the fiber reinforced resin layer 4 includes a reinforcing layer 41 and a protective layer 42. The reinforcing layer 41 is made of a carbon fiber reinforced resin (CFRP) including carbon fibers as reinforcing fibers and is formed by winding a continuous fiber bundle of the carbon fibers around the outer peripheral surface of the liner 3.

Further, the protective layer 42 is made of a glass fiber reinforced resin (GFRP) including glass fibers as reinforcing fibers and is formed by winding a continuous fiber bundle of the glass fibers around an outer peripheral surface of the reinforcing layer 41.

Note that these reinforcing fibers are wound in a state of a fiber bundle impregnated with a matrix resin, as described above. Other than the reinforcing fibers described above, the reinforcing fiber may be, for example, a fiber such as glass fiber, carbon fiber, aramid fiber, alumina fiber, boron fiber, steel fiber, PBO fiber, natural fiber, or high-strength polyethylene fiber.

Further, in the present embodiment, the matrix resins with which the fiber bundles of the reinforcing fibers in the reinforcing layer 41 and the protective layer 42 are impregnated are a thermosetting resin, and the thermosetting resin may be, for example, modified epoxy resin represented by epoxy resin and vinyl ester resin, phenolic resin, melamine resin, urea resin, unsaturated polyester resin, alkyd resin, polyurethane resin, or thermosetting polyimide resin. In the present embodiment, the matrix resin of the protective layer 42 is a resin similar to the matrix resin of the reinforcing layer 41, but these resins may be different from each other.

Note that the present embodiment deals with the thermosetting resin as the matrix resin, but the resin with which the fiber bundle is impregnated may be a thermoplastic resin, provided that the resin can be heated to a softening point (glass transition point) or more at the time of winding. The thermoplastic resin may be, for example, polyester resin, polypropylene resin, nylon resin (e.g., 6-nylon resin or 6,6-nylon resin), polyamide resin, polycarbonate resin, acryl resin, or ABS resin.

In the present embodiment, the protective layer 42 includes a main layer 42a covering the outer peripheral surface of the reinforcing layer 41 and a resin layer 42b covering an outer peripheral surface of the main layer 42a. As described above, the main layer 42a is made of the fiber reinforced resin constituted by the glass fibers and the matrix resin and is constituted by a plurality of layers by winding the fiber bundle of the glass fibers in hoop winding and helical winding.

Figure 5A:
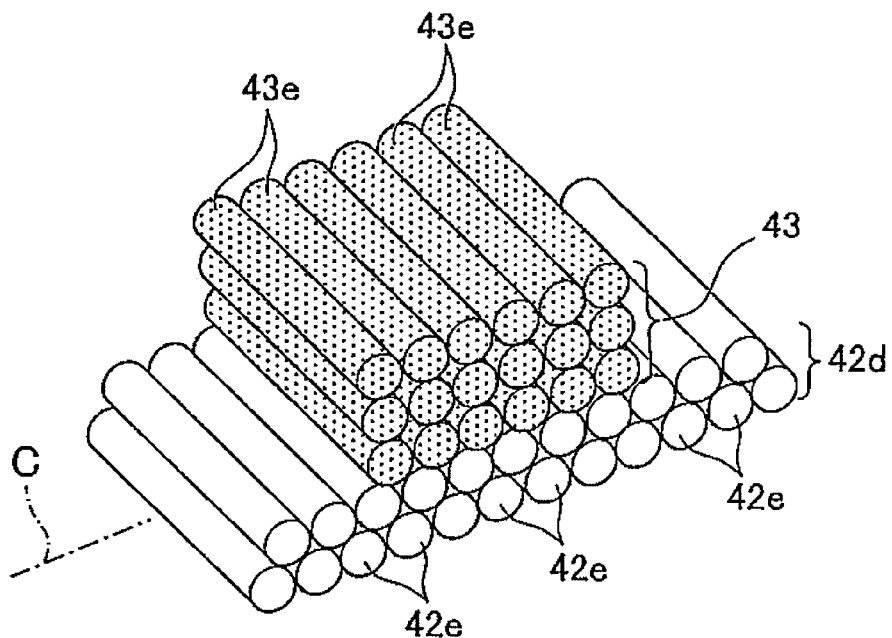
FIG. 5A is a schematic view to describe the orientation of reinforcing fibers near the protrusion portion of the high-pressure tank according to the present embodiment.

In an outermost layer of the main layer 42a (that is, an outermost layer of the fiber reinforced resin layer 4), an outermost layer 42d placed around the body portion 31 of the liner 3 (that is, an outermost layer of a part 46 covering the body portion 31; see FIG. 5A) is a layer formed in hoop winding as illustrated in FIG. 1. Note that the outermost layer as used herein is one or more layers winding in the same winding manner.

The outermost layer 42d is a hoop-winding layer constituted by at least one layer, preferably two or more layers, more preferably three or more layers in the layer thickness direction. The outermost layer 42d formed in hoop winding is a layer wound such that an edge of the fiber bundle in the width direction is overlapped at a uniform angle (a uniform angle in a range of −10° to 10°) slightly inclined from a direction perpendicular to the axial center C of the liner 3. Accordingly, in the present embodiment, as illustrated in FIG. 5A, reinforcing fibers 42e of the fiber bundle in the outermost layer 42d are oriented in a direction generally perpendicular to the axial center C around the axial center C of the liner 3.

Note that outermost layers (that is, outermost layers of parts 47A, 47B covering the side end portions 32A, 32B) placed around the side end portions 32A, 32B of the liner 3 are layers formed in helical winding. The helical winding is a layer formed such that the fiber bundle impregnated with the matrix resin is wound over the side end portions 32A, 32B on the opposite sides at an angle of 10° to 60° relative to the axial center C of the liner 3.

The resin layer 42b is a layer in which the matrix resin with which the glass fibers (reinforcing fibers) are impregnated partially oozes out on a surface of the fiber reinforced resin including the wound fiber bundle. Accordingly, the resin layer 42b is made of the same resin as the matrix resin of the main layer 42a. The outer surface of the fiber reinforced resin layer 4 is covered with the resin layer 42b, and an outer surface of a protrusion portion 43 (described later) is also covered with the resin layer 42b. The resin layer 42b is made of the same resin as the matrix resin of the main layer 42a, but may include a part of the glass fibers removed from the main layer 42a, for example.

Further, in the present embodiment, in the fiber reinforced resin layer 4, the protrusion portion 43 is formed in the part 46 covering the body portion 31 of the liner 3 (more specifically, the main layer 42a of the protective layer 42), and the protrusion portion 43 is formed to go around the high-pressure tank 1.

More specifically, the protrusion portion 43 is a part around which the fiber bundle impregnated with the matrix resin is continuously wound along the circumferential direction of the body portion 31 (in the direction perpendicular to the axial center C). Note that, as described above, the outer surface of the protrusion portion 43 is covered with the resin layer 42b. Further, the fiber bundle that forms the protrusion portion 43 and the fiber bundle of the protective layer 42 are constituted by one continuous fiber bundle.

In the present embodiment, as described above, the outermost layer 42d of the main layer 42a around the body portion 31 of the liner 3 is a layer formed in hoop winding, and the fiber bundle of the reinforcing fibers 42e in the outermost layer 42d is oriented around the axial center C of the liner 3 (that is, the direction generally perpendicular to the axial center C). Accordingly, as illustrated in FIG. 5A, reinforcing fibers 43e of the protrusion portion 43 and the reinforcing fibers 42e of the outermost layer 42d as an undercoating layer of the protrusion portion 43 are oriented generally in the same direction. Due to the orientation of the reinforcing fibers 42e, 43e, cracks L (described later) through which hydrogen gas passes are easily formed from the outermost layer 42d to the protrusion portion 43.

Figure 5B:
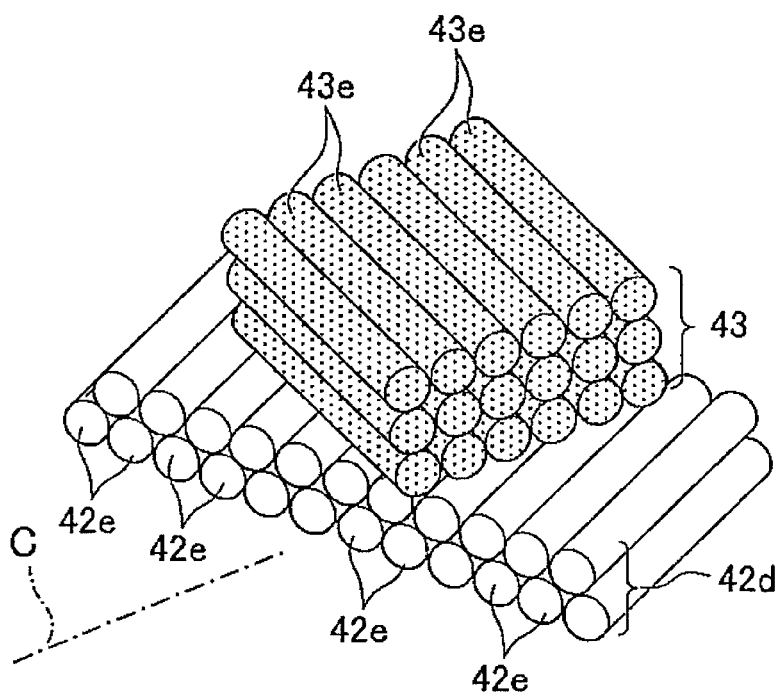
FIG. 5B is a schematic view to describe the orientation of reinforcing fibers near the protrusion portion according to a modification of FIG. 5A.

Note that the outermost layer 42d as the undercoating layer of the protrusion portion 43 may be a layer formed in helical winding, provided that cracks through which hydrogen gas passes are formed. In this case, as illustrated in FIG. 5B, the reinforcing fibers 42e of the outermost layer 42d and the reinforcing fibers 43e of the protrusion portion 43 are oriented to intersect with each other.

Figure 6:
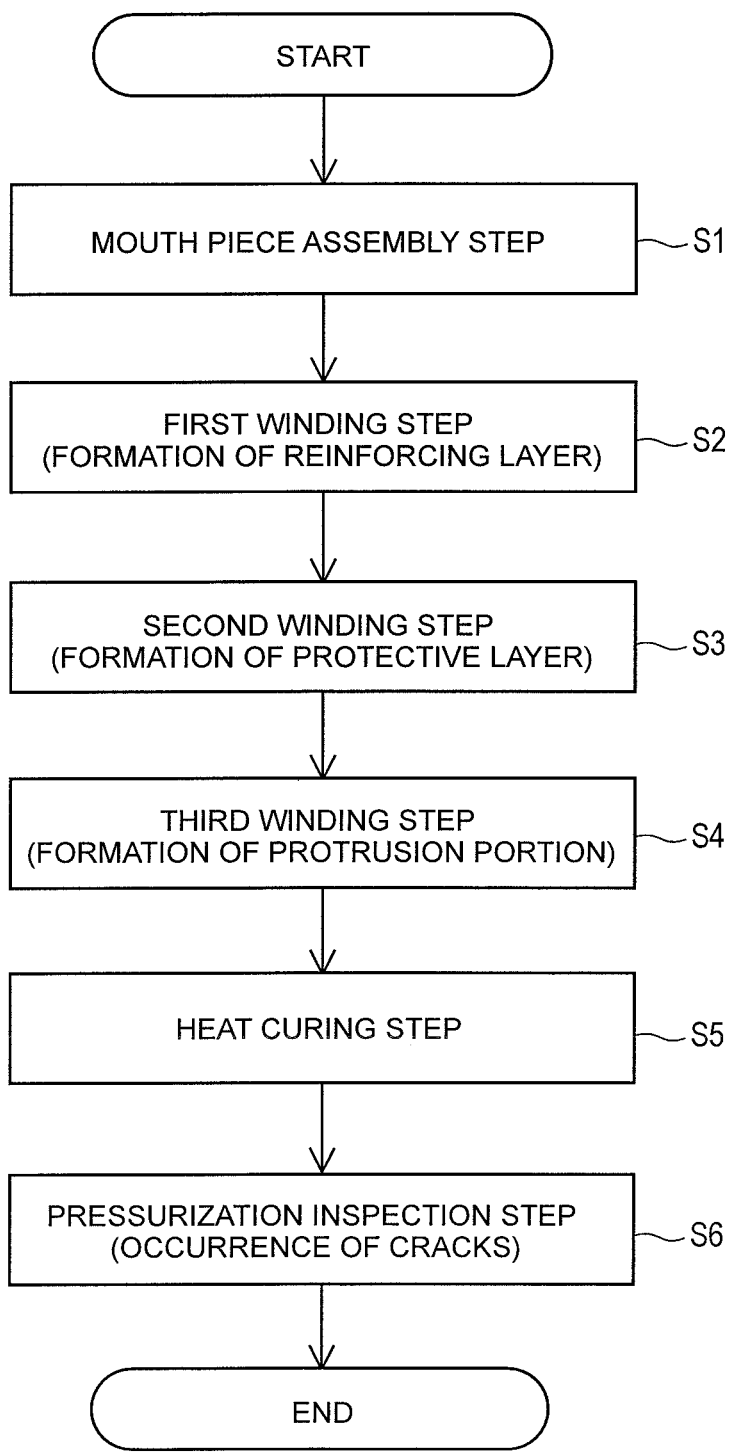
FIG. 6 is a flow diagram to describe steps of a manufacturing method of the high-pressure tank illustrated in FIG. 1.

The following describes a manufacturing method of the high-pressure tank 1 of the present embodiment in accordance with steps illustrated in FIG. 6. FIG. 6 is a flow diagram to describe the steps of the manufacturing method of the high-pressure tank 1 of the present embodiment.

In the manufacturing method of the present embodiment, a mouth piece assembly step S1 is performed first. In this step, the resin liner 3 having a shape illustrated in FIG. 1 is prepared. The mouth pieces 2A, 2B are attached to respective openings 33 formed in the side end portions 32A, 32B of the liner 3 thus prepared.

Then, a first winding step S2 is performed. In this step, a fiber bundle (CFRP prepreg) of carbon fibers impregnated with an uncured matrix resin is prepared. The fiber bundle thus prepared has a string shape (a tape shape), and the fiber bundle is wound, in a layered manner, around the surface of the liner 3 to which the mouth pieces 2A, 2B are attached, while a predetermined winding tension is applied. The winding is performed in hoop winding and helical winding by a filament winding method (FW method). Hereby, the reinforcing layer 41 in an uncured state is formed.

Figure 7A:
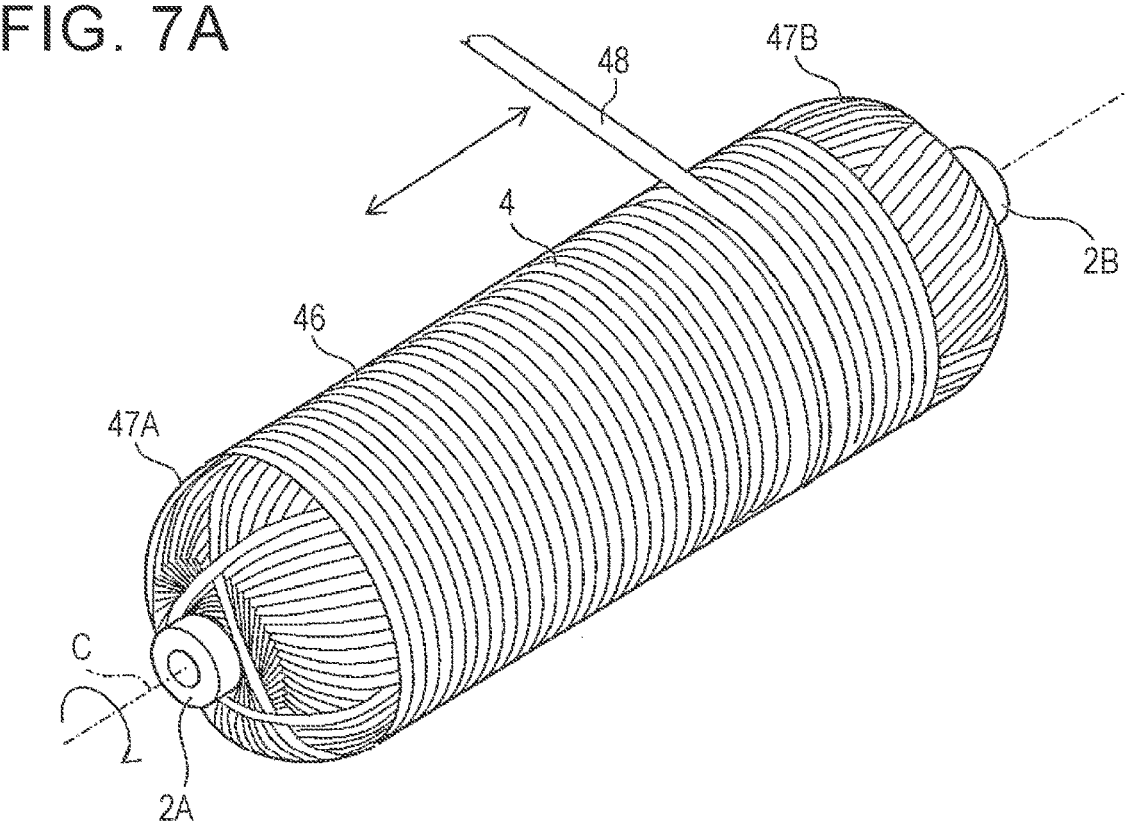
FIG. 7A is a schematic view to describe a part of the manufacturing method of the high-pressure tank illustrated in FIG. 1.

Then, a second winding step S3 is performed. In this step, a fiber bundle (GFRP prepreg) of glass fibers impregnated with an uncured matrix resin is prepared. The fiber bundle thus prepared has a string shape (a tape shape), and the fiber bundle is wound around the outer peripheral surface of the reinforcing layer 41 wound around the liner 3, so as to form the protective layer 42 in an uncured state. At this time, as illustrated in FIG. 7A, the outermost layer 42d of the protective layer 42 is formed in hoop winding. At the time when the fiber bundle (GFRP prepreg) 48 is wound in hoop winding, a winding position of the fiber bundle 48 reciprocates along the axial-center direction of the liner 3 while the liner 3 is rotated around the axial center C.

Figure 7B:
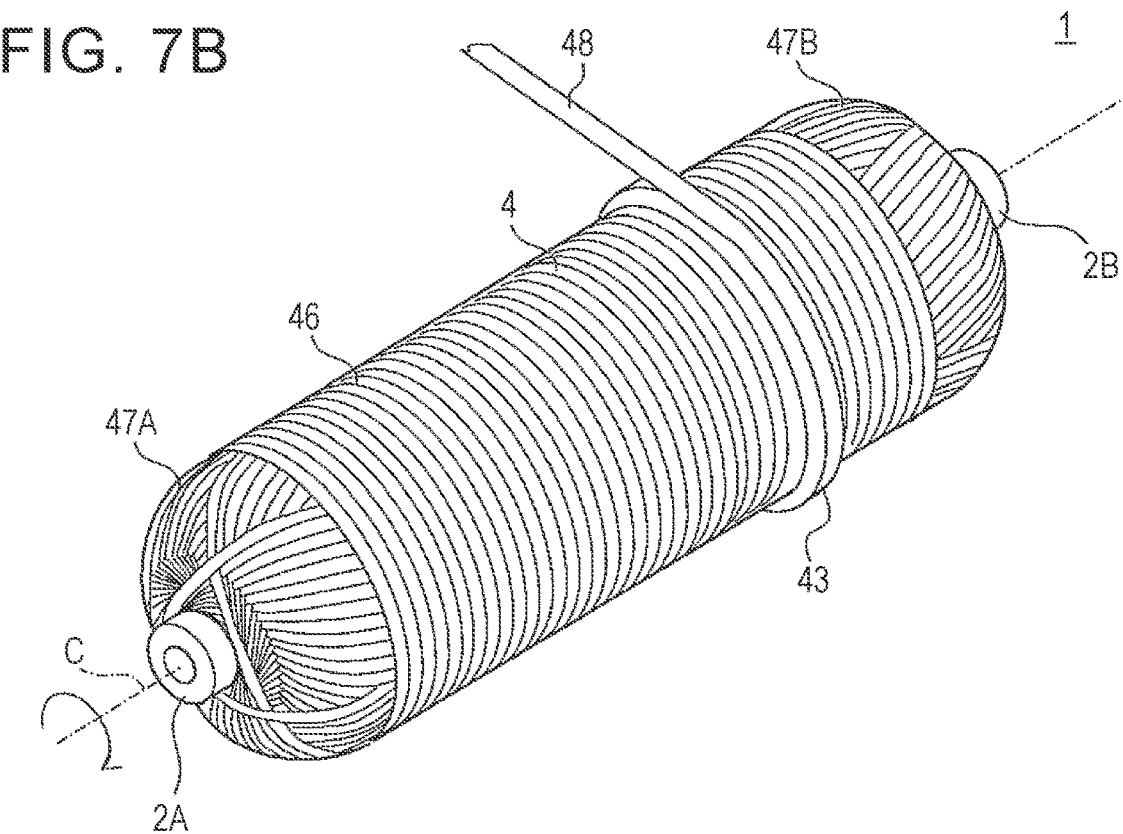
FIG. 7B is a schematic view to describe a part of the manufacturing method of the high-pressure tank illustrated in FIG. 1.

Then, a third winding step S4 is performed. In this step, without cutting the fiber bundle 48 in the second winding step S3, the movement of the winding position in the axial-center direction of the liner 3 is stopped while the liner 3 is rotated. Hereby, as illustrated in FIG. 7B, the fiber bundle 48 is continuously wound in an overlapped manner along the circumferential direction of the body portion 31 of the liner 3, so that the protrusion portion 43 is formed. The number of times of winding of the fiber bundle 48 is around two to five, and the number of times of winding is not particularly limited, provided that the protrusion portion 43 can be formed.

Then, a heat curing step S5 is performed. In this step, the high-pressure tank 1 is heated at a curing temperature of the matrix resins from the outside of the high-pressure tank 1, so that the uncured matrix resins included in the reinforcing layer 41 and the protective layer 42 are cured.

When heating is started in this step, the matrix resin with which the fiber bundle is impregnated partially oozes out on the surface of the protective layer 42 thus wound. A part where the matrix resin oozes out is formed in a layer (a liquid film) with a thickness of around 0.1 to 0.5 mm. As such, in the protective layer 42, the main layer 42a including the glass fibers and the matrix resin and the resin layer 42b constituted by the matrix resin thus oozing out are formed, and these resins are cured.

Subsequently, a pressurization inspection step S6 is performed. In this step, fluid such as water is introduced into the high-pressure tank 1, and a pressure test for pressurization inspection is performed. At this time, due to the pressurization in the high-pressure tank 1, a stress concentrates on the protrusion portion 43 formed in the fiber reinforced resin layer 4, so that cracks L are easily formed in the fiber reinforced resin layer 4 from the protrusion portion 43 as a starting point.

Particularly, a stress concentrates on a part (a bottom portion) where the protrusion portion 43 rises, so that the cracks L are formed in this part. Further, as illustrated in FIG. 5A, the reinforcing fibers 42e of the outermost layer 42d and the reinforcing fibers 43e of the protrusion portion 43 are oriented in the same direction, so that the cracks L through which hydrogen gas passes are formed from the outermost layer 42d to the protrusion portion 43.

Figure 9:
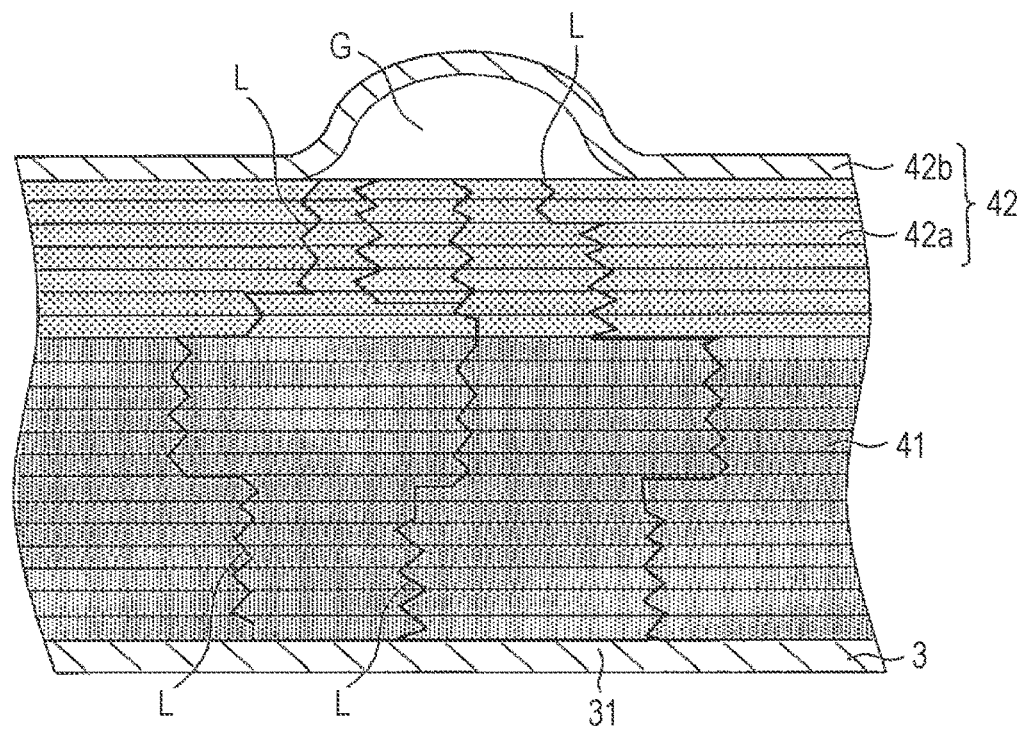
FIG. 9 is an enlarged sectional view of an essential part of a high-pressure tank as a comparative example and corresponds to FIG. 4.

As illustrated in FIG. 9, in a high-pressure tank 9 as a comparative example in which the protrusion portion 43 is not formed, cracks can be hardly formed in the resin layer 42b. Accordingly, hydrogen gas G stays in a boundary surface of the resin layer 42b in a sealed state, so that the hydrogen gas G easily reaches a high pressure. When this state is continued, cracks are formed in the resin layer 42b after the resin layer 42b swells out due to the hydrogen gas G thus reaching the high pressure, so that large abnormal noise might be caused in the high-pressure tank 9.

Figure 4:
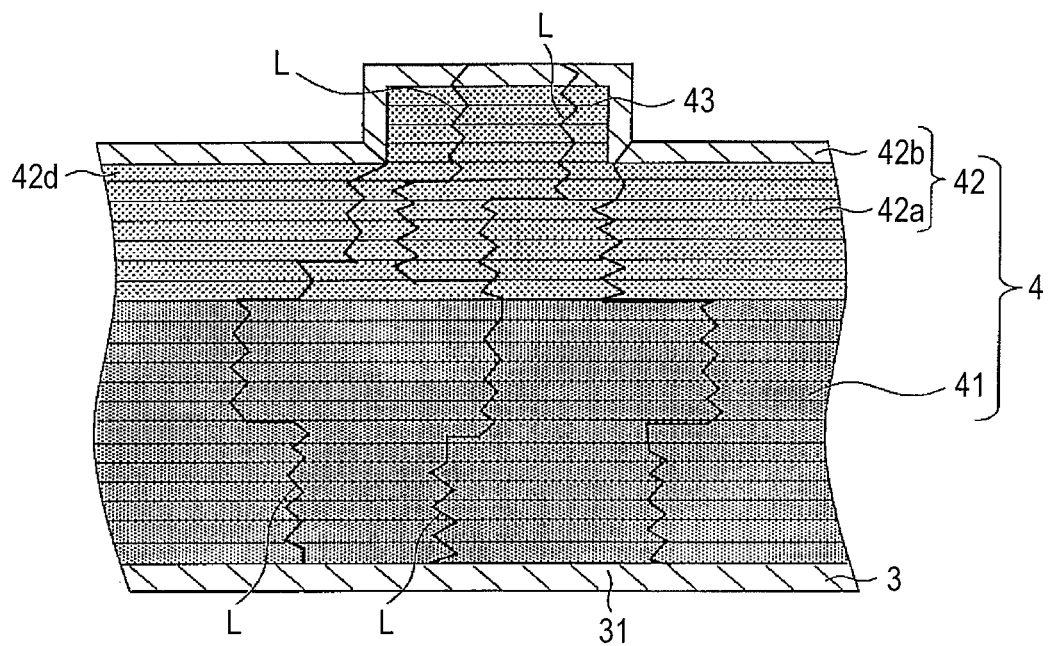
FIG. 4 is a schematic enlarged sectional view of the vicinity of a protrusion portion of the high-pressure tank illustrated in FIG. 1.

However, in the present embodiment, the cracks L reach the resin layer 42b of the fiber reinforced resin layer 4 as illustrated in FIG. 4, so that hydrogen gas can be released outside the high-pressure tank 1 through the cracks L. As a result, hydrogen gas can hardly stay, thereby making it possible to restrain large abnormal noise from being caused in the high-pressure tank 1.

Note that, in the pressurization inspection step S6, even if the cracks L are not formed in the resin layer 42b, the protrusion portion 43 has a shape on which a stress easily concentrates in comparison with other parts, and therefore, when hydrogen gas filled at the time of use of the high-pressure tank 1 reaches the protrusion portion 43, cracks in the resin layer 42b covering the protrusion portion 43 are formed at a pressure lower than that in other parts. In view of this, no crack is formed in the resin layer 42b after the high-pressure gas G stays unlike the one illustrated in FIG. 9. Accordingly, in the present embodiment, it is possible to restrain the occurrence of large abnormal noise in the high-pressure tank 1 and to discharge hydrogen gas.

Figure 8:
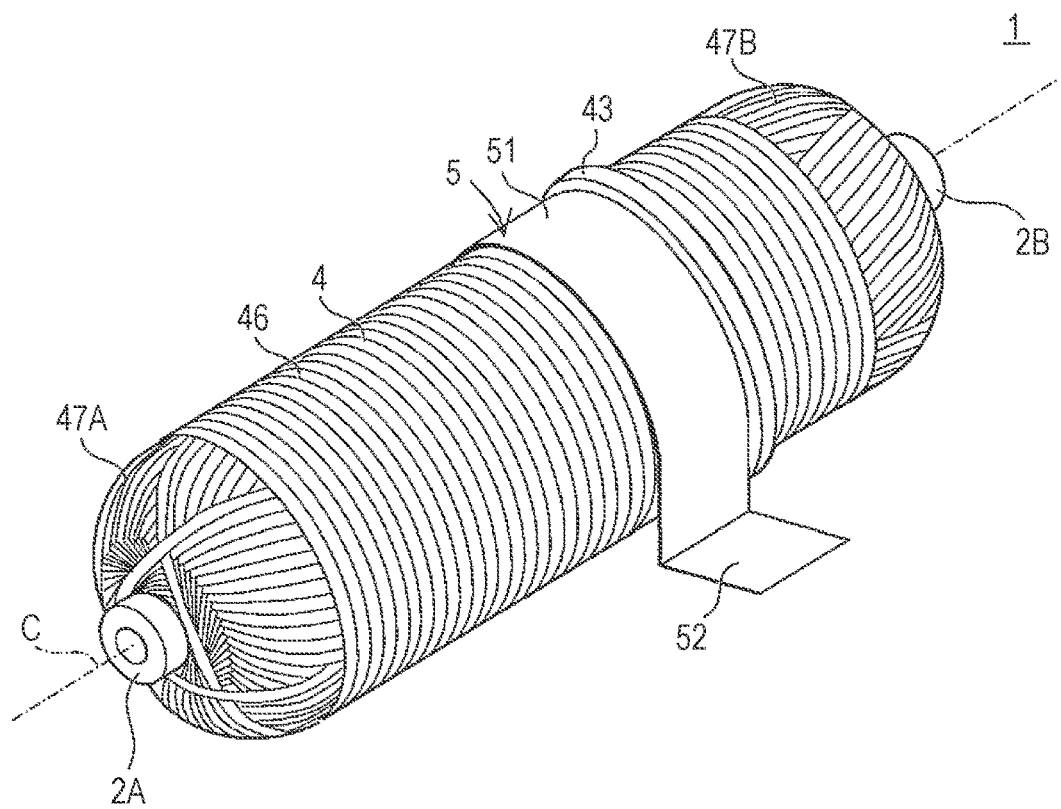
FIG. 8 is a schematic perspective view illustrating an example of an attachment structure of the high-pressure tank illustrated in FIG. 1.

The high-pressure tank 1 manufactured as such is provided in a vehicle. More specifically, as illustrated in FIG. 8, an attachment structure 1A for the high-pressure tank 1 is a structure including the high-pressure tank 1 and a band 5 configured to attach the high-pressure tank 1. More specifically, the band 5 includes a restricting portion 51 configured to be wound around a part of the part 46 covering the body portion 31 in the high-pressure tank 1 so as to restrict the high-pressure tank 1, and fixed portions 52 provided in the opposite ends of the restricting portion 51 and fixed to the vehicle via fixtures or the like. The band 5 is placed at a position adjacent to the protrusion portion 43.

Thus, the band 5 configured to attach the high-pressure tank 1 is placed at the position adjacent to the protrusion portion 43 of the high-pressure tank 1, so that the protrusion portion 43 of the high-pressure tank 1 is locked by the band 5, thereby making it possible to restrict the movement of the high-pressure tank 1 in the axial-center direction. As a result, a movement of the high-pressure tank 1 from a position where the high-pressure tank 1 is provided, due to slip of the band 5 relative to the high-pressure tank 1, is restricted, so that the high-pressure tank 1 can be stably fixed.

One embodiment of the disclosure has been described above in detail, but the disclosure is not limited to the above embodiment, and various design modifications can be made without departing from the spirit of the disclosure described in Claims.

In the present embodiment, one protrusion portion is provided in the high-pressure tank. However, two or more protrusion portions may be provided, for example, and the number of protrusion portions is not limited.

What is claimed is:

1. A high-pressure tank comprising:
   a liner made of resin and including a tubular body portion and a pair of dome-shaped side end portions provided in opposite ends of the tubular body portion;
   a fiber reinforced resin layer made of a fiber reinforced resin and covering an outer peripheral surface of the liner, the fiber reinforced resin layer formed by winding a fiber bundle impregnated with a matrix resin; and
   a resin layer made of the same resin as the matrix resin and provided over an outer surface of the fiber reinforced resin layer, wherein a part of the fiber reinforced resin layer includes a protrusion portion formed by continuously winding the fiber bundle in an overlapped manner along a circumferential direction of the tubular body portion, the part of the fiber reinforced resin layer covering the body portion.

2. An attachment structure for a high-pressure tank, the attachment structure comprising:
   the high-pressure tank according to claim 1; and
   a band configured to attach the high-pressure tank, wherein the band is placed at a position adjacent to the protrusion portion.

3. A high-pressure tank according to claim 1, wherein reinforcing fibers of the protrusion portion and reinforcing fibers of an outermost layer that forms an undercoating layer of the protrusion portion are oriented generally in the same direction.

* * * * *